United States Patent
Risse et al.

(10) Patent No.: US 8,845,037 B2
(45) Date of Patent: Sep. 30, 2014

(54) ANTI-THEFT PROTECTION FOR TRAILERS

(75) Inventors: Rainer Risse, Pattensen-Reden (DE); Axel Stender, Hameln (DE)

(73) Assignee: WABCO GmbH, Hannover (DE)

( * ) Notice: Subject to any disclaimer, the term of this patent is extended or adjusted under 35 U.S.C. 154(b) by 582 days.

(21) Appl. No.: 12/310,860

(22) PCT Filed: Aug. 4, 2007

(86) PCT No.: PCT/EP2007/006908
§ 371 (c)(1),
(2), (4) Date: Jul. 7, 2009

(87) PCT Pub. No.: WO2008/031479
PCT Pub. Date: Mar. 20, 2008

(65) Prior Publication Data
US 2010/0026084 A1    Feb. 4, 2010

(30) Foreign Application Priority Data
Sep. 13, 2006  (DE) .......................... 10 2006 042 925

(51) Int. Cl.
*B60R 25/08* (2006.01)
*B60T 8/32* (2006.01)
*B60T 17/18* (2006.01)
*B60T 17/02* (2006.01)

(52) U.S. Cl.
CPC ............... *B60T 17/18* (2013.01); *B60T 8/323* (2013.01); *B60R 2325/202* (2013.01); *B60R 25/08* (2013.01); *B60T 8/327* (2013.01)
USPC ................ 303/89; 303/15; 303/123; 180/287

(58) Field of Classification Search
USPC ............ 303/89, 3, 13, 15, 123; 188/265, 353; 280/428, 507; 180/275, 287
See application file for complete search history.

(56) References Cited

U.S. PATENT DOCUMENTS

| | | | | |
|---|---|---|---|---|
| 4,793,661 A | * | 12/1988 | Munro | 303/89 |
| 4,838,570 A | * | 6/1989 | Toikka et al. | 280/507 |
| 5,378,929 A | * | 1/1995 | Mor et al. | 303/89 |
| 6,144,910 A | * | 11/2000 | Scarlett et al. | 701/50 |
| 6,164,730 A | * | 12/2000 | Main | 303/89 |
| 6,268,793 B1 | * | 7/2001 | Rossi | 340/471 |
| 7,182,362 B2 | * | 2/2007 | Yeakel | 280/433 |
| 2001/0050509 A1 | | 12/2001 | Holt | |
| 2004/0036350 A1 | | 2/2004 | Rowe et al. | |
| 2005/0029859 A1 | * | 2/2005 | Bensch et al. | 303/89 |
| 2005/0062344 A1 | * | 3/2005 | Holt et al. | 303/7 |
| 2005/0116533 A1 | * | 6/2005 | Herges et al. | 303/3 |
| 2006/0012246 A1 | * | 1/2006 | Smith et al. | 303/155 |
| 2006/0289223 A1 | * | 12/2006 | Dolger et al. | 180/305 |

FOREIGN PATENT DOCUMENTS

| | | |
|---|---|---|
| EP | 1 075 989 A2 | 2/2001 |
| EP | 1 188 634 A2 | 3/2002 |

* cited by examiner

*Primary Examiner* — Melody Burch
(74) *Attorney, Agent, or Firm* — Kramer Levin Naftalis & Frankel LLP

(57) ABSTRACT

A device with an electronic brake system (EBS) and a brake assembly is provided for protecting against unauthorized removal of a trailer where a control device can activate and deactivate a protection state of the electronic brake system. When the electronic brake system is activated, protection can be provided by the brake assembly, which can brake the trailer if unauthorized removal is attempted.

15 Claims, 2 Drawing Sheets

(a)

(b)

ANTI-THEFT PROTECTION FOR TRAILERS

FIELD OF THE INVENTION

The present invention generally relates to embodiments of a device for protection of vehicle trailers against unauthorized removal.

BACKGROUND OF THE INVENTION

The simplest known mechanisms for protecting trailers against theft are locks on the king pin, thus, making it mechanically impossible to couple the trailer. However, they are inconvenient and expensive, and must be unlocked by mechanical action.

Vehicle brake systems that provide anti-theft protection are also known, which provide a valve in a pressurized-fluid line that depressurizes the fluid-pressure line in order to engage the brake. Such known systems combine the function of the valve with the actuation of a key, for example, so that the parking brake is released only if a key has been appropriately employed. A disadvantage of such systems is that the parking brake can be enabled only if the right key is in the possession of the person who wishes to remove the trailer. In addition, this conventional approach does not offer any flexible protection capable of being adapted to complex logistics.

To improve the reliability of the above anti-theft safeguard, the valve device can be interlocked by means of a coded electronic package integrated into the brake system so that not only the supply voltage but also an additional enabling operation is needed to unlock the valve device. Although these known anti-theft safeguards already have many advantages and, in particular, a heightened degree of security and reliability, it can be a disadvantage that current must be continuously present at a valve device in order to release the parking brake. If the valve device is isolated from the voltage supply, the valve immediately reverts to a condition in which the parking brake system is again engaged. A hazard might be presented in situations in which a trailer having such a brake system is inadvertently decoupled from the tractor, thus interrupting the voltage supply. To this extent, the operator control capability of these conventional protective devices is restricted to the functions offered by the integrated electronics package. Greater flexibility and adaptability of the protective mechanisms is not known.

SUMMARY OF THE INVENTION

Generally speaking, it is an object of the present invention to provide a device for trailers that protects against unauthorized removal in an improved manner.

Advantageously, according to embodiments of the present invention, the foregoing object is achieved by a device of the general type discussed above, which, for protection against unauthorized removal of the trailer, is equipped with a brake system having an electronic brake system (EBS) and an operator control device. The operator control device is actuated in order to activate or deactivate a protection component, or to perform operations. The electronic brake system is correspondingly driven by the operator control device, and the desired protection is achieved by a procedure of the brake system in which the brake system is made to brake the trailer in the event of unauthorized removal. The inventive device is therefore advantageously configured such that activation and deactivation can be achieved by a stand-alone operator control device. This operator control device is coupled with the electronic brake system, which is installed, for example, in a compact subassembly. Instead of the conventional signals for actuating the brakes during driving operation or for parking, additional signals are now supplied by the operator control device. The additional control signals cause the electronic brake system to actuate the brakes of the trailer in a predefined manner, in order to protect the trailer against unauthorized removal. According to this exemplary aspect of the present invention, further changes to the brake system or even to an internal electronic subassembly integrated into the brake system are completely unnecessary. Additionally, an already integrated electronic subassembly can be used more flexibly and more diversely. For example, the existing electronics, such as the electronic brake system (EBS), can be used and appropriately driven for the noted purposes. The further electronics and operator control elements needed for reliable activation and maintenance of protection component(s) are provided in a separate subassembly, which is referred to herein as an operator control device. The operator control device can be mounted in the form of a closed box or the like on the trailer. Operator control is exercised by actuation of operator control elements of diverse configurations on the operator control device.

According to an exemplary embodiment of the present invention, the device is configured to protect against the inadvertent mix-up of trailers, which can occur when the trailers are picked up by the tractors. In the case of conventional trailers, the protection component(s) is deactivated during coupling of the trailer. In many cases, the only distinction made in this situation is between authorized and non-authorized persons, such that, for example, one authorized person could couple several trailers or even entire groups of trailers and remove them. This may lead to mix-ups, causing the wrong trailer to be towed. In the case of temporary changes in logistics, errors costing time and money can occur. According to an advantageous aspect of the present invention, the controller of the inventive device is configured specifically with regard to this problem. For this purpose, an authentication function is provided, for example, by means of a PIN code, a magnetic card or a chip card, which identifies not only the vehicle operator but also the correct trailer and the corresponding cargo that are assigned to a particular trip. If the assignment is not carried out properly, the brakes (parking or service brake) of the trailer remain engaged, so that the trailer cannot be removed at all or can be removed only with difficulty. Accordingly, this advantageous configuration necessitates that the logistical sequences be considered in a manner that goes beyond simple authorization of persons to remove trailers. In this way, internal coding in the operator control device is expanded, adapted and refined to the point that every operation, including the individual trip of a trailer, can be allowed or disallowed by the brake system set up according to exemplary embodiments of the present invention. This is not possible with a protective mechanism that relies exclusively on an already built-in subassembly of the brake system. However, the inventive, advantageously expanded applicability is offered by an operator control device that cooperates with the existing components as described herein.

According to another advantageous embodiment of the present invention, the brake system of the trailer is provided with a control element configured to occupy at least two stable operating conditions in which the control element remains after the power supply has been disconnected, wherein the cylinder of a spring-actuated brake coupled with the control element is immobilized in a first condition. In contrast to the conventional brake systems, a novel brake system is accordingly provided with a control element that can occupy at least two stable conditions. As a result, it is ensured that a changeover to a condition different from that currently occupied cannot be caused by external influences, such as interruption of the supply voltage. Accordingly, the changeover from a first condition, in which, for example, the parking brake is not engaged, to a second condition, in which the brake is engaged, is advantageously made independent of other service or fail-safe functions of the trailer. In this way, inadvertent braking of the trailer during driving is prevented.

According to another advantageous embodiment of the present invention, the control element is shifted from the first condition to the second condition and from the second condition to the first condition by a single current or voltage pulse. This ensures that the changeover from a first condition of the control element—and therefore of the parking brake system—cannot occur accidentally, for example, but can occur only when the voltage supply is turned on. This, in turn, makes it possible to logically combine the engagement and release of the parking brake system as an authorization and authentication, as can be done, for example, by entering a PIN code. Actuation of a key is also conceivable, but it suffers from the above noted disadvantages. Nevertheless, the advantages of the inventive control element remain even if a key is used. The condition of the parking brake system is changed only if actually desired. The control element can be, for example, a bistable current surge valve, which is changed over by means of electromagnetic forces.

Another advantageous aspect of the present invention is achieved by braking with a defined braking action smaller than the maximum braking action in the event of unauthorized removal. As a result, it can be ensured that the trailer will not come to a complete stop. From this, it is evident for the first time that driving of the electronic brake system by a stand-alone operator control device offers improved control capability and, thus, new application possibilities. In contrast to conventional solutions, the anti-theft protection can, but does not have to be, provided as additional electronic or mechanical components in the brake system. Instead, an expanded and therefore more flexible protective effect against unauthorized removal is achieved according to exemplary embodiments of the present invention by the separate operator control device. According to an exemplary embodiment of the present invention, the brake system of the trailer can be regulated in metered manner. This yields numerous advantages. First, it is ensured that, in the event of inadvertent activation of the protection component(s), for example by malfunctions or operator error, the trailer is not blocked to the effect that it would lead to hazardous situations, such as fishtailing of the trailer. Second, the trailer can still be removed from hazardous situations even if one or more protection component(s) are activated. If the trailer is braked in such a way by electronic control of the operator control device that it cannot travel faster than a particular speed, then it can still be removed from railroad crossings or any other critical situations. In this way, improved protection of persons, including innocent third parties, is achieved on the whole.

According to another advantageous aspect of the invention, the metered braking action in the event of unauthorized removal of the trailer is controlled in such a way that the trailer is braked at a certain speed. This braking action can be advantageously executed by the service brake of the trailer. In principle, the parking brake, which is used for parking and as a rule is applied by a spring force, and the service brake, whose brake forces are applied pneumatically, function as protection components against unauthorized removal of the trailer. According to this exemplary aspect of the present invention, the service brake is advantageously used as a protection component against unauthorized removal of the trailer because it is set up to be driven especially for metered braking. This is a great advantage in connection with the foregoing aspect of protection against inadvertent mix-up of trailers because the risk for driver and vehicle is reduced. According to an advantageous configuration, a signal transducer, which is activated if the permissible speed is exceeded, can be connected at the output of a GIO (Generic Input Output). As an example, advantageous values of the maximum speed may be 10 km/h, or, in other words, walking pace.

According to additional advantageous configurations, the protection against unauthorized removal is deactivated by entering a coded numerical value (PIN) or by a magnetic card or chip card or else by a combination of the various options, and, if necessary, also by entering another coded numerical value. In this way, the operations for activating and deactivating the one or more protection components can be configured differently. Thus, it may be provided that the driver who intends to remove the trailer needs, for example, a chip card having a particular code, both being used appropriately for authentication at the operator control device. To turn on the protection component at the destination, it is then possible, for example, to provide a simple general mechanism, such as pressing a pushbutton on the operator control device. In this way, the protection component can be activated by any person, even without knowledge of a special code. In particular, according to exemplary embodiments of the present invention, the protection component can be automatically activated when the ignition of the tractor is turned off. Other variants of this aspect of the invention may be a super PIN to immobilize the vehicle if the PIN of a driver is lost. The super PIN can advantageously be written into the end-of-line (EOL) protocol upon completion of the manufacturer's commissioning tests on the vehicle. The super PIN can then be obtained, for example, by a query to the vehicle manufacturer and, for example, logically combined with the chassis number of the vehicle.

In this connection, it is also advantageously considered that activation and deactivation of the protection against unauthorized removal can be executed externally on the trailer. This is possible by disposing the operator control device appropriately at a readily accessible location.

According to another advantageous configuration of the present invention, the protection against unauthorized removal of the trailer is activated automatically or manually at the operator control device and deactivated once again by a radio signal, such as an SMS (Short Message Service). This abbreviation "SMS" refers to the option, offered by the mobile radio service provider, of transmitting text messages. In principle, modifications thereof may also be used in connection with the present invention, provided they permit the transmission of a well-defined radio signal. According to yet another advantageous configuration, a radio signal such as an SMS may also be used at the operator control device to activate and deactivate the protection component against unauthorized removal. As a result, even further ranging flexibility during use of trailers is achieved, and, especially, greater independence from whether the respective person who wishes to remove the trailer is in possession of the proper means, such as keys or the like. An appropriate SMS for activation and deactivation may therefore be used from considerable distance to enable the trailer. This creates completely novel logistical possibilities for the use of trailers. The distinction between automatic or manual activation and deactivation by radio signal, such as an SMS, has the following advantage: any arbitrary driver may set the protective device to "armed" upon exiting the vehicle. Thereafter, control of removal of the trailer once again is guaranteed by a monitoring center, for example.

According to another advantageous configuration of the present invention, the protection against unauthorized removal, especially as anti-theft protection, can be communicated via a CAN data line from the tractor to the trailer. This allows for control over the trailer to be exercised from the tractor.

Still other objects and advantages of the present invention will in part be obvious and will in part be apparent from the specification.

The present invention accordingly comprises the features of construction, combination of elements, and arrangement of parts that will be exemplified in the constructions hereinafter set forth, and the scope of the invention will be indicated in the claims.

BRIEF DESCRIPTION OF THE DRAWINGS

For a further understanding of the invention, reference is had to the following description taken in connection with the accompanying drawings, in which.

DETAILED DESCRIPTION OF THE PREFERRED EMBODIMENTS

Figure 1:
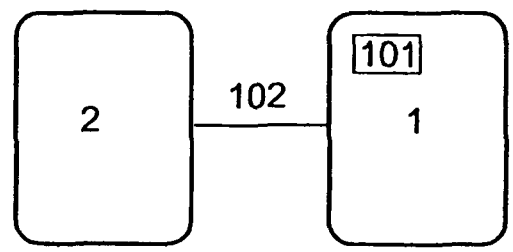
FIG. 1(a) is a simplified schematic diagram of a conventional brake system.
FIG. 1(b) is a simplified schematic diagram of an anti-theft protection device in accordance with an embodiment of the present invention.
Figure 1:
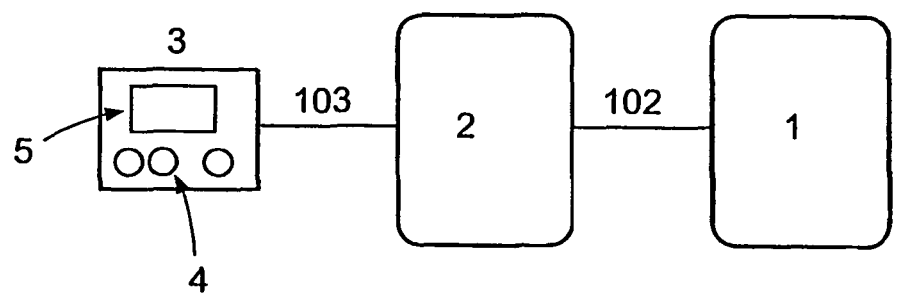

Referring now to the drawing figures, FIG. 1(a) shows a brake system according to the prior art. For example, an electronic brake system (EBS) 2 is coupled with brake system 1. Within brake system 1, there is disposed a stand-alone electronic subassembly 101, which is intended to provide a protective mechanism. Brake system 1 is coupled with EBS 2 via lines 102, which ensure the control operations for brake system 1.

FIG. 1(b) shows a simplified block diagram of a device according to an embodiment of the present invention. Operator control device 3 is coupled with EBS 2. In an electronically regulated brake system, the driver issues the braking instructions by electrical signals, whereby such instructions are converted within an electronic subassembly into control signals for a brake system controlled with a pressurized fluid (e.g., air, hydraulic fluid, etc.). Some of the valves can be positioned to be driven physically close to the electronic subassembly (e.g., electronic subassembly 101 of FIG. 1(a)). The electronically regulated brake system can include functions such as, for example, an automatic, load-dependent brake or an anti-lock brake system. EBS 2 is responsive to control signals 103 and communicates with brake system 1 by additional signals or by line 102, which conveys a pressurized fluid. As illustrated in FIG. 1, the control according to this aspect of the present invention takes place using operator control device 3, which drives EBS 2 in a way that leads to actuation of brake system 1, which can take place even in normal operation. Operator control device 3 is provided with operator control elements 4, such as, for example, pushbuttons, keys or the like, with which the functions can be executed. In addition, a display 5 that enables menu-driven operator control is preferably provided on operator control device 3. Operator control device 3 can be configured to accept a PIN code, which activates or deactivates the one or more protection components. A reader device for magnetic or chip cards may also be provided on operator control device 3 (e.g., as one of operator control elements 4), so that activation or deactivation of the protection component(s) is effected by a card or the combination of a card and a PIN code. It is particularly advantageous for the coding to be programmed such that it assigns not only the driver or the vehicle but also a specific trip with a particular cargo for a driver. In this way, the protection can be advantageously used for logistical planning and control of freight. Thereby, errors are prevented.

Operator control device 3 or EBS 2 can also contain a unit with which radio signals for activation and deactivation of the protection against unauthorized removal can be received. In an exemplary embodiment, EBS 2 or operator control device 3 is constructed and arranged to receive and evaluate SMSs and to use them for activation and deactivation of the protection component(s). Also, activation and deactivation of the protection component(s) by a CAN bus of a tractor coupled to the trailer is also contemplated.

Figure 2:
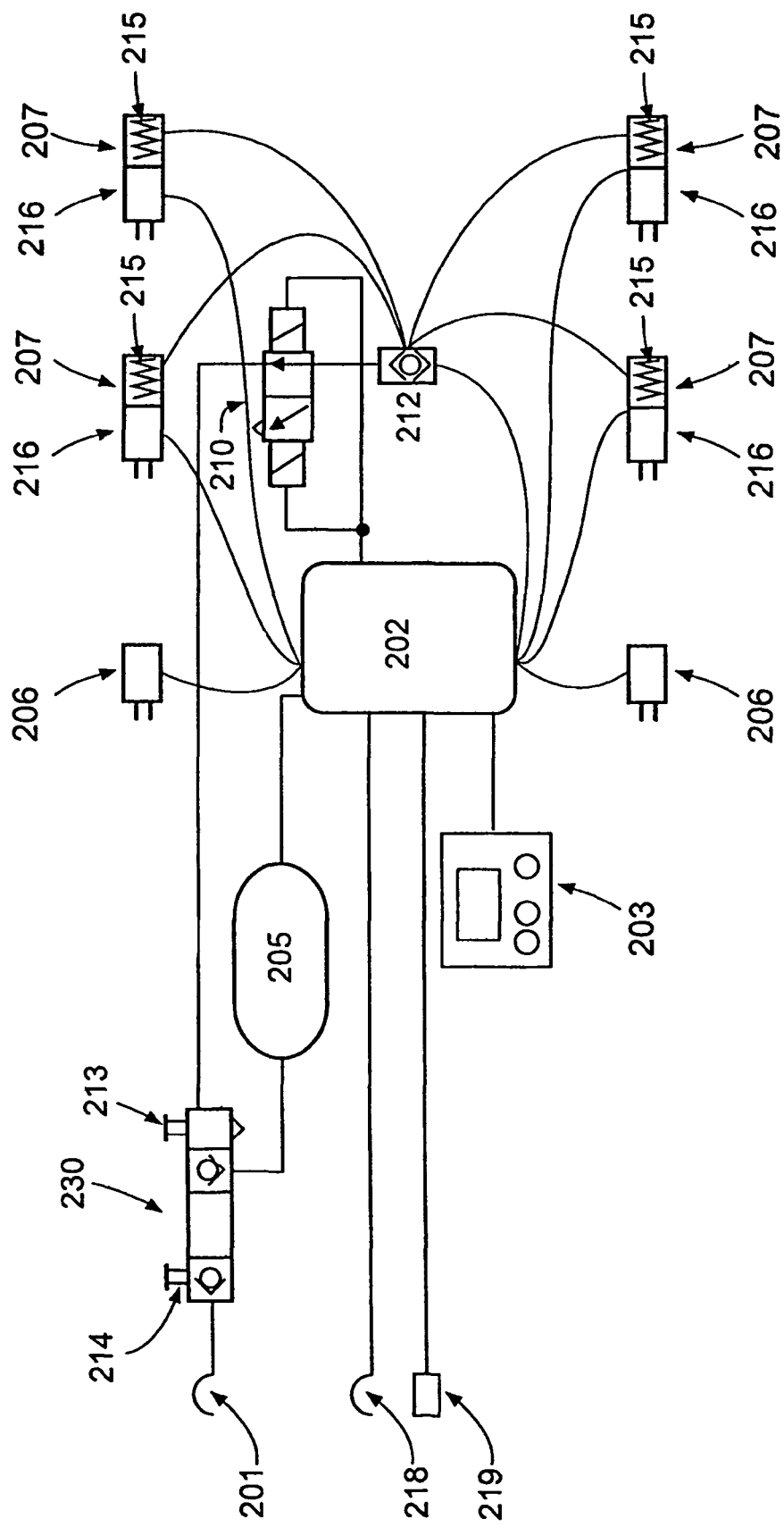
FIG. 2 is a simplified schematic diagram of a brake system in accordance with an embodiment of the present invention.

FIG. 2 shows a schematic diagram of a brake system that implements exemplary aspects of the present invention. According to this exemplary embodiment, a trailer equipped with the inventive device can be coupled with the tractor via a coupling head for reservoir pressure 201. Via a trailer brake valve 230, the control pressure is conducted to electronic brake system (EBS) 202. Trailer brake valve 230 is provided with a first actuating pushbutton 213 for manual actuation of the parking brake system. A second actuating pushbutton 214 is provided for releasing the automatic brake when the trailer is decoupled. The reservoir pressure flows via a check valve integrated in the trailer brake valve 230 to reservoir pressure tank 205. The vehicle can be activated pneumatically via pneumatic control line 218, and the trailer can be driven electrically via electrical brake line 219. Service brake 206 and service-brake parts 216 of combination brake cylinders 207 are driven by EBS 202. In order to protect the wheel brakes from being destroyed by an overload due to addition of the forces of the combination brake cylinders 207, an overload protection valve 212, which, in this example, comprises a 3/2-way valve, is provided in the brake system. Pressure is distributed to the combination brake cylinders 207 by this valve. The parking brake is engaged by actuation of actuating pushbutton 213. Thereby, the parking brake part of the combination cylinder is vented so that the integrated spring can actuate the wheel brake. If the service brake is additionally actuated while the parking brake is actuated, the brake pressure flows via overload protection valve 212 into the parking brake part of combination cylinders 207 and, in this way, reduces the force in the parking brake part in proportion to the brake force built up in the service-brake part so that no addition of forces takes place.

According to exemplary embodiments of the present invention, a bistable current surge valve 210 is provided, which is disposed between the parking brake valve of trailer valve 230 and spring-actuated brake cylinder 215 of combination brake cylinder 207. Bistable current surge valve 210 is able to occupy two positions (conditions), and it can switch back and forth between the two conditions using two electromagnets. If bistable current surge valve 210 is in one of the two stable conditions, this condition is maintained even if bistable current surge valve 210 is isolated from the power supply. According to an exemplary aspect of the invention, therefore, only a short current surge or current pulse is necessary to change over from a first stable condition to a second stable condition of bistable current surge valve 210. A continuous supply with current is not detrimental, but it is also no longer absolutely necessary in order to switch between the two conditions or to maintain one of the two conditions. In a first condition of bistable current surge valve 210, trailer brake valve 230 with overload protection valve 212 is supplied with compressed air. If the connecting line from reservoir accumulator 205 is pressurized with compressed air, the parking brake is released against the spring pressure of the parking brake part of combination brake cylinder 207. If bistable current surge valve 210 is shifted into the second stable condition by a current surge, the connecting line to overload protection valve 212 is vented. As a result, spring-actuated brake cylinders 215 of combination cylinders 207, which are coupled to overload protection valve 212, are also vented and the parking brake system is engaged.

According to an advantageous configuration, current surge valve 210 can also be equipped with only one magnet, which shifts the valve from one stable condition to the other and back. Still other possible configurations are conceivable for a device according to this exemplary aspect of the present invention, provided they have at least two stable conditions that are substantially independent of energy. On the other hand, a minimal energy source, such as, for example, a buffer battery or the like, can also be installed to maintain a condition, provided it makes the trailer independent of the voltage supply of the tractor.

In an advantageous configuration, service brake 206 is or service-brake parts 216 of combination brake cylinders 207 are used for protection of the trailer. In this case, these are driven by EBS 202. Braking is activated by the operator control device. In an exemplary, advantageous configuration, the brake is braked in a manner corresponding to a specific brake pressure, such as, for example, 3.0 bar, at a defined maximum speed, if the protection component(s) has been activated and the vehicle is being removed without authorization. As a result, the trailer can be removed only at walking pace, for example, 10 km/h. The advantage lies in the fact that the trailer still has a measure of maneuverability and, for example, can be removed from hazardous situations. According to another exemplary configuration, an electrical signal is presented if a maximum speed is exceeded, in turn activating a signal transducer, such as the horn or the like.

By analogy to FIG. 1, an operator control device 203 coupled with EBS 202 is illustrated in FIG. 2. According to exemplary embodiments of the present invention, operator control device 203 is used to activate or deactivate the protection against unauthorized removal. For this purpose, operator control device 203 is provided with the operator control elements described above with reference to FIG. 1, such as keys, displays, etc. Further advantageous configurations make it possible, via operator control device 203, to activate or deactivate the inventive protection component(s) by a radio signal, for example, such as an SMS or the like. In an advantageous configuration, activation can be achieved in simple manual manner merely by pressing a key or the like, whereas deactivation can be achieved only by SMS from an authorized monitoring center.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A device for protection against unauthorized removal of a trailer, the trailer having a first electronic brake system and a second brake system, the device comprising:
   an operator controller configured to protect against the unauthorized removal of the trailer by at least one of activating and deactivating a first protection component that comprises service brakes of the second brake system and a second protection component that comprises a spring-actuated brake of the second brake system; and
   a control element coupled to (i) the first electronic brake system, (ii) a parking brake valve of the second brake system, and (iii) an overload protection valve of the second brake system via a connecting line, wherein the operator controller is configured to activate the first protection component by controlling the first electronic brake system to activate the service brakes, wherein the operator controller is configured to activate the second protection component by controlling the control element via the first electronic brake system to vent the connecting line such that the spring-actuated brake is engaged, and wherein the operator controller is configured to receive at least one of a first coded numerical value and authentication information to activate and deactivate the first and second protection components.

2. The device of claim 1, wherein the control element is shiftable from a first stable operating condition to a second stable operating condition by at least one of a single current and voltage pulse.

3. The device of claim 1, wherein when any one of the first and second protection components is activated, the trailer is braked with a metered braking action, the metered braking action being smaller than a maximum braking action, such that the trailer is not fully stopped.

4. The device of claim 3, wherein the metered braking action is controlled to prevent the trailer from exceeding a predetermined speed.

5. The device of claim 3, wherein the metered braking action is effected by one of the spring-actuated brake and the service brakes.

6. The device of claim 4, wherein when the predetermined speed is exceeded, a signal is presented at a predefined signal output of the trailer.

7. The device of claim 1, wherein the authentication information is obtainable from one of a magnetic card and a chip card.

8. The device of claim 1, wherein activation and deactivation of the first and second protection components is performed externally on the trailer.

9. The device of claim 1, wherein the operator controller (i) activates at least one of the first and second protection components at least one of automatically and manually, and (ii) deactivates at least one of the first and second protection components in response to receiving a radio signal.

10. The device of claim 1, wherein the operator controller activates and deactivates at least one of the first and second protection components in response to receiving a radio signal.

11. The device of claim 1, wherein at least one of the first and second protection components is activatable and deactivatable by a tractor coupled to the trailer, the tractor being configured to activate and deactivate the at least one of the first and second protection components via a controller-area network interface.

12. The device of claim 9, wherein the radio signal is a Short Message Service.

13. The device of claim 10, wherein the radio signal is a Short Message Service.

14. The device of claim 1, wherein the control element comprises a bistable current surge valve.

15. The device of claim 1, wherein the control element is configured to vent the connecting line by occupying a first of two stable operating conditions, and wherein the control element is configured to remain in the first stable operating condition even after a power supply is disconnected from the control element.

\* \* \* \* \*